(12) United States Patent
Dempsey

(10) Patent No.: US 6,572,773 B1
(45) Date of Patent: Jun. 3, 2003

(54) NITRIFICATION PROCESS

(75) Inventor: Michael John Dempsey, Manchester (GB)

(73) Assignee: The Manchester Metropolitan University, Manchester (GB)

(*) Notice: Subject to any disclaimer, the term of this patent is extended or adjusted under 35 U.S.C. 154(b) by 0 days.

(21) Appl. No.: 09/830,418

(22) PCT Filed: Oct. 26, 1999

(86) PCT No.: PCT/GB99/03542

§ 371 (c)(1), (2), (4) Date: Jun. 29, 2001

(87) PCT Pub. No.: WO00/24682

PCT Pub. Date: May 4, 2000

(30) Foreign Application Priority Data

Oct. 27, 1998 (GB) ............................................. 9823496

(51) Int. Cl.⁷ ................................................. C02F 3/06
(52) U.S. Cl. ..................... 210/614; 210/617; 210/618; 210/151; 210/903
(58) Field of Search ................ 210/614, 617, 210/618, 620, 631, 150, 151, 903

(56) References Cited

U.S. PATENT DOCUMENTS

| | | | | |
|---|---|---|---|---|
| 3,855,120 A | * | 12/1974 | Garbo ......................... | 210/618 |
| 4,009,099 A | | 2/1977 | Jeris | |
| 4,053,396 A | * | 10/1977 | Trense et al. ................ | 210/618 |
| 4,188,289 A | * | 2/1980 | Besik .......................... | 210/617 |
| 4,620,929 A | * | 11/1986 | Hofmann .................... | 210/617 |
| 4,655,924 A | * | 4/1987 | Heijen ......................... | 210/617 |
| 4,681,685 A | * | 7/1987 | Sutton et al. ................ | 210/618 |
| 4,832,848 A | * | 5/1989 | Velebil et al. .............. | 210/150 |
| 5,747,311 A | | 5/1998 | Jewell | |
| 6,007,721 A | * | 12/1999 | Payraudeau et al. ........ | 210/614 |

FOREIGN PATENT DOCUMENTS

EP    0 861 808    9/1998

OTHER PUBLICATIONS

Steel R McGhee "Water Supply and Sewerage" p. 558, 1979.*

* cited by examiner

Primary Examiner—Christopher Upton
(74) Attorney, Agent, or Firm—Nixon & Vanderhye

(57) ABSTRACT

The present invention concerns the field of nitrification of fluids, and particularly relates to the treatment of aqueous fluids to oxidize ammonia and nitrites to produce nitrates. One aspect of the present invention seeks to provide an alternative nitrification process which is readily capable of commercial implementation, and in which the nitrification rate more nearly approaches the rate of ammonia generation. According to one aspect of the present invention there is provided a microbiological process for the nitrification of a fluid comprising passing the fluid to be nitrified through an immobilized biomass comprising nitrifying bacteria, characterised in that the bacteria are immobilized as a biofilm grown on porous particles, in particular coke.

19 Claims, No Drawings

NITRIFICATION PROCESS

The present invention concerns the field of nitrification of fluids, and particularly relates to the treatment of aqueous fluids and liquids to oxidize ammonia and nitrites to produce nitrates.

Ammonia and nitrite are toxic to higher life forms. Their concentration in effluent discharges and water for drinking is strictly controlled. It is known to use nitrifying bacteria to oxidize ammonia and nitrite to nitrate. This is a natural process in soil and water whereby ammonia is oxidized sequentially to the nitrite and thence to nitrate. Excess ammonia is often formed during the biological stage of conventional sewage treatment. It is also a by-product of various industries, for example the coking of coal, petroleum refining, certain chemical processes, animal husbandry and aquaculture.

In sewage treatment, a series of physical, chemical and biological processes are used to produce an effluent suitable for discharge into natural waterways. The biological treatment often results in the production of ammonia faster than it can be removed by nitrification, because the lithotrophic nitrifying bacteria have lower metabolic rates than the heterotrophic ammonia generators. Ammonia or nitrite content in the treated water returned to rivers or reservoirs is a toxic hazard. Hence where excess ammonia content is present in sewage treatment processes, a separate, dedicated nitrification process is used.

This involves the use of a trickling filter in which nitrifying bacteria are grown as a coherent layer on inert packing material layers disposed on very large trickling pans. Other prior art nitrification processes exist; these include activated sludge processes; rotating biological contactor processes, fixed or compacted bed treatment processes and fluidized bed processes. Attempts to improve the nitrification efficiency have resulted in the development of new processes in which nitrifying bacteria are immobilized on polystyrene beads and these beads are allowed to float on the waste water being treated. However, even these later processes are only capable of a nitrification rate of 1 kg $N/m^3 \cdot d^{-1}$ (manufacturer's figures), which is well below the normal rate of heterotrophic ammonia generation referred to above.

indeed, such microbial processes suffer from a number of drawbacks; in particular although these processes all make use of carriers with high surface areas, once the development of the microbial film reaches a certain level, the effective surface area is reduced significantly. Attempts to overcome this problem had been proposed whereby small particles, such as sand, have been used as carriers in bioreactors, but these frequently become clogged with suspended solids. In addition, the attached biofilms quickly bridge the particles thus again significantly reducing the effective surface area of the biofilm.

U.S. Pat. No 4,009,099 relates to a biological process for removing ammonia nitrogen from waste water by forming a fluidized bed of microorganisms attached to a solid particulate carrier continuously passing waste water to be treated through said fluidized bed, adding oxygen to said fluidized bed, retain the waste water in the fluidized bed for sufficient period of time while controlling other necessary parameters to biologically convert substantially all of the ammonia nitrogen to be removed from the waste water, to oxidize forms of nitrogen, water and cellular material and thence withdrawing the biologically converted products from the fluidized bed.

In operation of this process, however, as the ammonia oxidation reaction proceeds in the fluidized bed, bacteria grows on the surface of the carrier particles. After a time, if unchecked, the particles tend to agglomerate to form a layer which thickens to form a gelatinous mass. As a result the surface area per unit reactor volume available for biological reaction is greatly reduced; and the efficiency of the process effectively slumps. Furthermore, particles tend to be carried out in the fluid bed as their specific gravity decreases. They also tend to become attached to gas bubbles within the reactor which assists removal of the particles from the reactor.

In order to overcome these problems, excess bacterial growth is typically mechanically removed from the particles. The significant disadvantage of this process is the drawing of a fine balance between the vigour of the removal of the excess bacterial material on the one hand and the maintenance of a sufficient layer of biofilm on the particles on the other, to enable the process to continue.

European Patent Specification No 0861808 relates to a waste water treatment apparatus comprising a waste water treatment tank in which carrier particles support a surface layer of microbe are charged and decomposing and eliminating an organic matter and/or inorganic matter contained in a waste water, and a membrane module for filtering water to be treated which goes out from sand treatment tank, non-permeating water not passing through the membrane being retained and recirculated to the treatment tank. Such a system relies on a filtration system for further purifying water. In this process carriers for immobilizing microbes may comprise a vinyl alcohol resin and acrylic resin in combination with porous inorganic compounds. In this particular embodiment the combination of synthetic and inorganic carriers is required to constitute the carrier for the biomass.

U.S. Pat. No 5,747,311 relates to a method for chemical modifying a reaction medium using microbes, the method including providing particular material comprising a plastic carrier and microbes attached to the carrier in which the particulate material has a specific gravity, less than specific gravity of the dispersing fluid.

The disadvantage of the prior art methods is the problem of disposing of excess bacterial growth together with the potential loss of particulate material. The present invention seeks to overcome these disadvantages by providing a more stable support for the biomass.

One aspect of the present invention seeks to provide an alternative nitrification process which is readily capable of commercial implementation, and in which the nitrification rate more nearly approaches the rate of ammonia generation.

According to one aspect of the present invention there is provided a microbiological process for the nitrification of a fluid which process comprises passing the fluid to be nitrified through an immobilized biomass comprising nitrifying bacteria, characterised in that the bacteria are immobilized as a biofilm grown on coke particles having a "glassy" or slightly glazed surface and a size substantially within the range 0.25 to 2.50 mm.

Another aspect of the invention provides for the immobilization of a biomass on a porous particle to provide a biomass of increased stability thereby allowing a significant increase in concentration of biomass in a biomass reactor. As bacteria die, the concentration is maintained by the sloughing off of dead film and regrowth of fresh biomass. This high concentration stability is surprising and unusual for immobilised biomasses which are relatively unstable and prone to deterioration, especially when immobilised in gel. Any detached biofilm from the particles tends to be highly flocculant, sediments rapidly and is therefore easily removed from the treated fluid eg as by a sedimentation chamber or hydrocyclone. In addition the stability of the film means that high rates of fluid throughput can be used in reactors without the washing away of growing bacteria cells. Hence dilution rate can, unusually, exceed the growth rate.

The invention further includes a biomass of increased concentration and activity characterised it that the biomass is supported as porous particles.

Preferably, the coke particles should have interconnected pores which allow the removal of air therefrom and which admit water and permit the invasion of biomass. That coke may be used as an immobiliser for a biomass is surprising in view of the fact that it is usually considered a non-biocompatible material which has a wide range of potentially harmful constituents.

In preferred embodiments, the porous particles each have a size substantially within the range 0.25 to 2.50 mm, and optimally in the range of about 0.7 to 1.0 mm and preferably 1.0 to 1.4 mm for plant cells. Reasonable grading of particles can be achieved by sieving, and washing if necessary to remove dust.

Typically, the porous coke particles may be derived from coke grades having a "glassy" or slightly glazed surface and grades such as "production breeze" and "belt-return breeze" have been found to be particularly effective. Good results have been achieved with Chesterfield coke which exhibits the particular "glassy" property compared to the crystalline nature of many other cokes.

The biomass film on each particle may have an average thickness of less than 1 mm. The biomass film may have an average thickness of between about 0.4 mm and about 0.6 mm. In certain preferred embodiments the film has a thickness of about 0.5 mm.

The nitrifying bacteria may comprise Nitrosomonas, Nitrosococcus, Nitrosospira, Nitrosolobus, Nitrosovibrio, Nitrobacter, Nitrospina, Nitrococcus and Nitrospira. The optimum reported temperatures for the growth of nitrifying bacteria are 25 to 30° C. Hence it was surprising to discover that the optimum range for the process of the present invention is significantly less than this range. Specifically, the very good results may be obtained between 13 to 17° C. Optimum results have been found between the range 14 to 16° C. Hence according a particular embodiment of the invention the fluid temperature is maintained within 13 to 17° C. and preferably with 14 to 16° C.

The best pH range for the nitrification process has been discovered to be between 7.5 and 8.5, and optimally between 7.8 and 8.0. Hence according to the present invention the pH of the fluid is controlled to be between 7.5 and 8.5, and preferably to be between 7.8 and 8.0.

The bed of porous particles may be disposed in a reactor and the fluid to be nitrified may be passed upwards through the bed, as in an expanded or fluidized bed reactor.

The fluid may be recirculated through the reactor after having passed up through the reactor. If the nitrification is substantially complete after one pass, then re-circulation is not necessary.

The fluid is preferably oxygenated before entry to the base of the bed, whether single-pass or recirculation is employed. In this way, oxygen required by the bacteria is supplied.

Owing to its low solubility, the rate-limiting factor for most aerobic biological processes is the supply of oxygen. In order to alleviate this problem, increased pressure or supplementation with pure oxygen has been used in the biological process industries. A cheaper and simpler alternative is to use hydrogen peroxide. We have found that the nitrifying biofilms of the present invention possess the necessary enzymes to release oxygen from hydrogen peroxide. Calculations indicate that a concentration of 2 mMdm$^{-3}$ should supply enough oxygen to oxidise 13 mM(20 mg)dm$^{-3}$ ammonia-nitrogen, which is typical of activated sludge effluent.

The fluid may be oxygenated by aeration using air or hydrogen peroxide. Pure oxygen may be used to oxygenate the fluid, but air or hydrogen peroxide is preferred as it is cheaper. In addition the efficiency of nitrification is such that oxygen levels of fluid leaving the reactor may be very low, leading to highly efficient aeration. This means that aeration by air is highly effective for processes of the present invention. Suitable aeration methods will be known to the person skilled in the art. It is preferred that the fluid is oxygenated separately from the nitrification biomass; this prevents damage to the biofilm by bubbling air or oxygen through the reactor as is the case with prior art processes. One preferred arrangement, which is compatible with the present invention, is aeration in a separate counter-current recirculation loop.

According to another aspect of the invention the fluid to be nitrified is circulated from one end of the reactor bed to another end thereof, so that the concentration of dissolved oxygen in the fluid falls between the one end and the another end, the concentration of oxygen at the said another end being controlled such that the concentration of oxygen in the fluid is just above a level at which the concentration would be rate limiting for the nitrifying process.

According to yet another aspect of the invention there is provided a process for the preparation of a nitrification reactor comprising introducing into a reactor a reactor bed comprising porous particles, introducing a bacterial growth medium and nitrifying bacteria into the reactor and causing said fluid to pass through the reactor bed, thereby to cause, or allow a film of bacteria to grow on the particles.

It will be appreciated that the optimum conditions for reactor preparation by biomass growth generally correspond with the optimum conditions for nitrification. Hence the variations and preferred arrangements discussed in the forgoing will have application in respect of the preparation process.

According to a further aspect of the invention, there is provided apparatus for the nitrification of a fluid comprising: a reactor provided with a reactor bed and means for causing a fluid to be nitrified to pass through the bed, characterised in that the reactor bed comprises porous particles upon which each of which has been grown a biofilm of nitrifying bacteria.

The apparatus may be provided with means for controlling the temperature of the fluid. Suitable apparatus is well known, for example a thermostat and heating element in contact with the fluid.

The apparatus may be provided with means for aerating the fluid. Suitable apparatus are well known. For example an aeration column through which is blown air or oxygen.

The apparatus may be provided with means for testing and adjusting the pH of the fluid to an optimum level. Suitable means are well known. For example an electronic pH meter and biologically compatible alkaline additives such as sodium carbonate.

The apparatus may be provided with means for controlling the rate of fluid flow through the reactor bed. For example, pumps with adjustable pump velocities may be employed.

According to yet a further aspect of the invention there is provided apparatus as hereinbefore described and provided with means for sampling the oxygen concentration in the fluid before or during entry into the reactor, and means for sampling the oxygen concentration of the fluid during exiting, or after exiting, the reactor. Means for adjusting the flow rate of fluid through the reactor (ie the upward velocity) so that it is fairly constant. The flow rate into the reactor can be adjusted according to the influent and/or effluent ammonia concentration or some other operating parameters, such as dissolved oxygen concentration in the fluidised bed effluent.

The nitrification process of the present invention has been found to be capable of operating effectively over a wide range of temperatures and pH. The process is operable over the range 0 to 40° C. The process is highly effective over the range 5 to 35° C. and over the pH range 5 to 10. Hence according to another aspect of the invention there is provided a nitrification process as hereinbefore described wherein the temperature of the fluid is between 5 to 35° C. and the pH of the fluid is between 5.6 to 9.

Following is a description by way of example only of methods of putting the present invention into effect.

EXAMPLE 1

This example relates to the preparation of a fluidized bed reactor for use in the nitrification process of the present invention. Three types of Chesterfield coke were tested for suitability; "production breeze", "belt-return breeze" and "pond breeze". Of these the two former were preferred because the latter contained particles which floated in water, and were therefore unsuitable for a fluidized bed process. The coke was sieved to obtain particles in the size range 0.7 to 1.0 mm. Earlier testing had shown this size range to produce the best colonization by bacteria. The coke was rinsed in water to remove any coke dust from the particles. The rinsed coke was then dried. The dried coke was autoclaved under water to expel air from the pores of the coke. An alternative method of expelling air from the coke is to immerse the coke in ethanol or some other water miscible, coke-wetting liquid. A bio-reactor column was filled with coke to a level of about 30% of the height of the column.

An aqueous bacterial growth medium was then prepared. The medium comprised water to which has been added ammonium sulphate as the source of ammonia to feed the bacteria. The compositions of suitable growth media are disclosed by Robertson et al (1989) "The effect of thiosulphate and other inhibitors of autotrophic nitrification on heterotrophic nitrifyers", Antonie van Leeuwenhoek 56, pp 302–309. The growth medium was oxygenated by passing through a standard aeration device involving pumping air through the fluid. The oxygenated growth medium was then used to fluidize the coke bed by pumping the medium upwards through the coke bed. The pumping rate was adjusted to an upwards velocity of about 0.85 cm/s to produce approximately 50% expansion of the coke bed, corresponding to an increase in the coke bed level in the reactor column to about 45% of the column height. The temperature of the growth medium was controlled to between 25–30° C. which is reported as the best temperature range for the bacterial growth. The medium was then inoculated with a mixed microbial population, substantially comprising nitrifying bacteria such as species of the following genera Nitrosomonas, Nitrosococcus, Nitrosospira, Nitrosolobus, Nitrosovibrio, Nitrobacter, Nitrospina, Nitrococcus and Nitrospira bacteria. The growth medium was then recirculated through the bed to begin the growth of bacteria on the coke. The process develops by flocculant bacterial growth appearing above the coke bed. This flocculant becomes attached to the coke particles beneath. Gradually a biofilm develops and spreads downwards through the reactor column. The film formation process involves the pores of the coke becoming colonized with biomass, and then the complete overgrowth of each particle occurs. Eventually the particles become embedded in a biofilm which is typically 0.5 mm thick.

During colonization, the density of the composite (coke and bacteria) particles falls because the density of the biomass is less than that of the coke. Consequently, the volume of the bed increases. Gradually the height of the bed increases to about double its static, non fluidized state. The flow rate of the growth medium can be maintained constant during this process. With subsequent biofilm growth the fluidized bed expands to fill the reactor column. If it is desired to obtain higher biomass loading, the upward velocity of the fluidizing medium can be reduced down to 30% so that the expansion of the colonized particles is reduced, allowing more biomass growth in the column. In this way a biomass concentration close to the theoretical maximum for pure biomass pellets (36 g/l dry weight of 100% expansion U=0.85 cm5$^{-1}$; 55 g/l of 30% U=0.45 cm5$^{-1}$) can be achieved with a biofilm thickness of only 0.5 mm. This concentration compares very favourably with the concentrations of 0.1 to 0.2 g/l typical in trickling filters and 1 to 2 g/l inactivated sludge.

The following example uses a fluidized bed reactor as prepared above.

EXAMPLE 2

This example demonstrates the nitrification capabilities of the prepared reactor column. An ammonia-containing aqueous medium (artificial waste water) was pumped up through the reactor bed. The waste water comprised a mineral salts medium containing 280 mg N as ammonia. Sodium carbonate was used to control pH and as a source of carbon.

The process was tested over wide range of temperatures and pH. The process was effective over a range of 6 to 33° C. and a pH range of 5.6 to 9.0.

Results

The maximum nitrification rate was found to be 3.5 kg/m$^3$·d$^{-1}$ at a pH of 7.8 to 8.0, a temperature of 14 to 16° C. and a bioreactor residence time of 1.6 h.

At a pH of 5.6 the nitrification rate was 0.6 kg/m$^3$·d$^{-1}$ at 25° C. At a pH of 9.0 the nitrification rate was 2.2 kg m$^3$·d$^{-1}$ both at 14° C. and at 25° C.

It was surprising that the optimum nitrification level was at a lower temperature than the accepted optimum range for growth of the bacteria, which is 25 to 30° C.

EXAMPLE 3

Artificial waste water was produced, based upon the compositions disclosed by Robertson et al (ibid.). Ammonium sulphate was added to produce two compositions of waste water, each with a different ammonia concentration. Composition A had an ammonia concentration of 140 mg/l NH$_3$—N and composition B had a concentration of 280 mg/l NH$_3$—N. The waste water was supplied in each test at an upwards velocity of 0.45–0.85 cm/s. The waste water was recirculated and aerated separately to maintain oxygen content in the water entering the reactor column.

Results

For composition A the maximum rate of nitrification was 120 mg/l/h. This equates to achieving complete nitrification with a residence time in the reactor of less than 1.2 hours, a re-circulation rate of 70 and the removal of 2.0 mg/l/re-circulation pass.

For composition B the maximum rate of nitrification was 145 mg/l/h. This equates to achieving complete nitrification with a residence time of 2 hours, a re-circulation ratio of 120 and the removal of 2.4 mg/l/pass.

The amount of ammonia oxidized per pass is limited by the solubility of oxygen because 1.5 moles of oxygen are required fully to oxidize 1 mole of ammonium to nitrate. At 20° C. the maximum solubility of oxygen in water is about 8 mg/l. Therefore the theoretical maximum amount of ammonium that can be oxidized per pass is about 3.0 mg/l. Thus a removal rate of 2.4 mg/l/pass was extremely efficient (80%) and is close to the theoretical maximum.

EXAMPLE 4

Artificial ground water was prepared mimicking the content of ground water contaminated by low concentrations of ammonia. Ammonium sulphate was added as the source of ammonia, to an ammonium concentration of 1 to 2 mg/l. In this case, complete oxidation of the ammonium to nitrate was achieved in a single pass of the ground water through the reactor.

What is claimed is:

1. A microbiological process for the nitrification of a fluid which process comprises passing the fluid to be nitrified through a bed of biomass comprising nitrifying bacteria, wherein the biomass is immobilized as a biofilm grown on coke particles having a glassy or slightly glazed non-crystalline surface and a size substantially within the range 0.25 to 2.50 mm.

2. A process as claimed in claim 1 wherein the porous particles each have a size substantially within the range 0.7 to 1.0 mm.

3. A process as claimed in claim 1 wherein the biomass film has an average thickness of less than 1 mm.

4. A process as claimed in claim 1 wherein the biomass film has an average thickness of about 0.5 mm.

5. A process as claimed in claim 1 wherein the bed of porous particles is disposed in a reactor and the fluid to be nitrified is passed upwards through the bed.

6. A process as claimed in claim 1 wherein the fluid is oxygenated separately from the nitrification biomass.

7. A process as claimed in claim 1 wherein the fluid to be nitrified is circulated from one end of the reactor bed to another end thereof, so that the concentration of dissolved oxygen in the fluid falls between the one end and another end, the concentration of oxygen at the said another end being controlled such that the concentration of oxygen in the fluid is just above a level at which the concentration would be rate limiting for the nitrifying process.

8. A process as claimed in claim 1 wherein the temperature of the fluid is controlled to within the range 13 to 17° C.

9. A process as claimed in claim 1 wherein the pH of the fluid is controlled to within the range 7.5 to 8.5.

10. A process as claimed in claim 1 wherein the fluid is sewage.

11. A process as claimed in claim 1 wherein the fluid is water.

12. A process as claimed in claim 1 wherein the fluid is an effluent.

13. Apparatus for the nitrification of a fluid comprising: a reactor provided with a reactor bed and means for causing a fluid to be nitrified to pass through the bed, characterised in that the reactor bed comprises coke particles having a "glassy" or slightly glazed surface and a size substantially within the range 0.25 to 2.50 mm and in that the particles carry a biofilm of nitrifying bacteria on the surface thereof.

14. Apparatus as claimed in claim 13 including means for aerating the fluid.

15. Apparatus as claimed in claim 13 including control means for controlling the rate of fluid flow through the reactor bed.

16. Apparatus as claimed in claim 15 wherein the control means includes means for sampling the oxygen concentration in the fluid before or during entry into the reactor, and means for sampling the oxygen concentration of the fluid during exiting, or after exiting the reactor and further provided with means for adjusting the flow rate of fluid through the reactor, or other reactor parameters, such that the oxygen concentration on leaving the reactor is just above a concentration at which the oxygen concentration would be rate controlling for the nitrification process.

17. Apparatus as claimed in claim 13 including means to separate sloughed biomass.

18. Apparatus as claimed in claim 17 wherein the separation means is a sedimentation tank or hydrocyclone.

19. A process for the preparation of a nitrification reactor as claimed in claim 13 comprising introducing into a reactor bed comprising porous particles, introducing a liquid bacterial growth medium and nitrifying bacteria into the reactor and causing said fluid to pass through the reactor bed, thereby to cause a film of bacteria to grow on the particles.

* * * * *